Patented Feb. 23, 1926.

1,574,477

UNITED STATES PATENT OFFICE.

ARTHUR LAW GRANT, OF PLAINFIELD, NEW JERSEY.

WATER PURIFIER.

No Drawing.   Application filed December 13, 1923. Serial No. 680,399.

*To all whom it may concern:*

Be it known that I, ARTHUR LAW GRANT, a citizen of Great Britain, residing in the city of Plainfield, county of Union, and State of New Jersey, have invented certain new and useful Improvements in Water Purifiers, of which the following is a specification.

This invention relates to water purifiers and more particularly to the kind in which certain chemicals are added to water for the purpose of removing from the water a permanent hardness.

Heretofore it has been proposed to use sodium carbonate which, while it removes practically all the lime existing as sulphate or chloride, and when used in conjunction with lime, practically all of the lime existing as bicarbonate and nearly all of the magnesia yet at the same time leaves behind it the sodium salts of these acids, except carbonic acid with which the lime and magnesia were combined. In many cases this is not disadvantageous but where it is desired to use such purified water for the generation of steam it is found that the boiler has to be blown off very frequently and fresh water used in order to prevent too great a concentration of the sodium salts which otherwise produce foaming or priming of the contents of the boiler. It has also been proposed to use zeolite, but the objection is that soluble salts are formed, and that frequent blowing off of the boiler and substituting fresh water is necessary to prevent foaming. My invention overcomes these defects, in that the water is purified without substituting foam-producing salts, nor soluble salts. To carry out my invention and to remove the permanent hardness from water to be purified, I use barium silicate which may be suitably prepared by means well known to one skilled in the art.

The invention consists of certain features which will be more fully described hereinafter and finally pointed out in the claims.

In order to enable my invention to be understood the following equations might be said to represent symbolically the main reactions of the barium silicate when added to water. It is, of course, well known that waters to be purified vary in different localities and in different parts of the country so that it has become the common practice of men skilled in this art to make preliminary tests of the water to be purified and determine the quantity of purifying chemicals in relation to such tests. The following reactions are given:

(1) $CaSO_4 + MgCO_3 + BaSiO_3 = MgSiO_3 + CaCO_3 + BaSO_4$.

Other reactions to which reference will be made are:—

(2) $CaSO_4 + BaSiO_3 = CaSiO_3 + BaSO_4$.
(3) $MgSO_4 + BaSiO_3 = MgSiO_3 + BaSO_4$.
(4) $Na_2SO_4 + BaSiO_3 = Na_2SiO_3 + BaSO_4$.
(5) $MgCl_2 + Na_2SiO_3 = MgSiO_3 + 2NaCl$.
(6) $Ca(HCO_3)_2 + CaH_2O_2 = 2CaCO_3 + 2H_2O$.
(7) $Mg(HCO_3)_2 + CaH_2O_2 = CaCO_3 + MgCO_3 + 2H_2O$.
(8) $MgCO_3 + CaH_2O_2 = CaCO_3 + MgH_2O_2$.
(9) $CO_2 + CaH_2O_2 = CaCO_3 + H_2O$.
(10) $CaSiO_3 + MgCO_3 = CaCO_3 + MgSiO_3$.
(11) $Ca(HCO_3)_2 + heat = CaCO_3 + H_2O + CO_2$.
(12) $Mg(HCO_3)_2 + heat = MgCO_3 + H_2O + CO_2$.

A study of the foregoing equations will show in round numbers 213 parts of barium silicate must be used for every 80 parts of sulphur trioxide contained in the water to be softened and at the same time there must be present 84 parts of magnesium carbonate for every 136 parts of calcium sulphate in the water. If sufficient magnesium carbonate be not present, it may be added to the water. If too much carbonate of magnesium is present in the water, the excess may be removed with lime or hydrated lime as indicated in equation 8, where 74 parts of hydrated lime are shown to be capable of decomposing 84 parts of carbonate of magnesia. Equation 5 is given to indicate that (NO_3 may be substituted for chlorine, and calcium for magnesium where necessary), when the water to be purified contains sodium sulphate, the silicate of soda formed as per equation 4 by the action of barium silicate upon it, decomposes the magnesium or calcium salts of any acid radical besides sulphuric acid that the water may contain, forming magnesium silicate or calcium silicate and the sodium salts of the acid radicals. If calcium silicate be formed a further amount of magnesium carbonate must be used, 84 parts of magnesium carbonate for every 116 parts of calcium silicate. This reaction is represented by equation 10.

Any excess of sodium silicate beyond what is required to accomplish the above end remains as such. Should a study of the analysis of the water to be analyzed indicate that there will not be sufficient sodium silicate formed to effect this, enough sodium sulphate may be aded to the water to form by its action on the barium silicate the required amount.

Equation 3 shows that for every 120 parts of magnesium sulphate present in the water, 213 parts of barium silicate must be used to remove it.

Practical application of the foregoing:

From a study of the analysis of the water to be purified, the amount of lime necessary to remove: free carbon dioxide (equation 9); the temporary hardness (equation 6); one molecule of carbon dioxide from the magnesium bicarbonate (equation 7); the excess of magnesium carbonate, if any, over that necessary to satisfy equation 1; is calculated and this amount is added to the amount of water upon which the calculation is based. The water is contained in a tank or other suitable vessel fitted with a stirring apparatus. Although the operation may take place in the cold, yet it is better in order to secure quickness of action and in order to cause the calcium carbonate to be precipitated in the crystalline, instead of the amorphous, condition, to heat the water by steam or otherwise, to a temperature of at least 45° C. Other things being equal, the hotter the water the quicker the reaction occurs.

The calculated amount of barium silicate is now added together with necessary amount of magnesium carbonate, should any be required, and the whole is well agitated until the completion of the reaction. As soon as the reaction is ended, this requiring about half an hour, the contents of the tank or other receptacle is either allowed to settle and the clear water is drawn off, or the whole may be filtered at once, as may be convenient. This will produce a softened water containing not more than one and one-half grains per gallon of lime and magnesia combined, estimated as carbonates.

Instead of purifying the water outside of the steam boiler, if the water is to be used for steam purposes, the barium silicate may be added to the water in the boiler itself, using the same amounts of barium silicate as would be used in softening the water outside of the boiler. If it be considered necessary, the theoretical amount of magnesium carbonate may be as per equation. If it be not considered necessary, the excess of sulphate of lime above that necessary to bring equation 1 in operation, will be precipitated as silicate of lime as represented in equation 2. As the calcium silicate is precipitated in powdered form, it will not produce scales. The mixture of the barium silicate by itself or with magnesium carbonate may be added once a day or more often as may be desired, the compound being first thoroughly mixed with water in order to avoid the formation of lumps. No lime is necessary in this case, the temporary hardness being removed by heat alone as represented by equations 11 and 12, while the scale forming salts are precipitated as powdery substances and being weighted with barium sulphate, have no tendency to cause foaming.

As an example: A water containing: $CO_2$, 0.35 grains per gallon; alkalinity as $CaCO_3$, 8.18 grains per gallon; $CaO$, 4.58 grains per gallon; $MgO$, 3.00; $SO_3$, 7.64; $Cl$, 0.37; alkalies undetermined, $SiO_2$, 1.46; total solids (ignited) 23.13, was concentrated 50 to 1 after adding the requisite amount of barium silicate. The concentrated water contained: $SiO_2$, 71.71 grains per gallon (forming apparently $Na_2O,2SiO_2$); total $Na_2O$, 36.03 grains per gallon; $CaO$, 0.58 grains per gallon; $SO_3$, 4.0 grains per gallon; $MgO$, 0.4 grains per gallon; $Cl$, 20.2 grains per gallon; total solids, 159.5 grains per gallon. It will be noted that the total solids are very small, since the original water contained 23.13, upon a 50 to 1 concentration.

If the same water had been treated by the lime soda process and concentrated to the same extent, the total solids would have been about 700 grains per gallon. If a zeolite process had been used, the total solids would have been over 1000 grains per gallon.

From the foregoing it will be seen that the improved water purifier has distinct advantages over the soda lime and the zeolite process. My improved water purifier is very simple in application, since it is only necessary to add barium silicate in the manner described above.

Barium silicate may be obtained by precipitating a solution of silicate of soda with soluble barium salt or by melting barium sulphate with silica either with or without the addition of carbon, or any other well known means, and in any case the product, barium silicate, must be very finely ground to a fine flour-like powder. The addition of a very finely ground barium silicate to the water in the manner as hereinabove described, renders the water purifying process extremely simple and particularly efficient and advantageous, in that all of the scale forming substances in the water are removed as insoluble compounds and at the same time, no foam producing salts are formed in substitution thereof, nor are any soluble salts formed. Both scale formation and foam production are therefore obviated.

This invention may be developed within the scope of the following claims without departing from the essential features of the same and it is desired that the specification and drawings be read as being merely illustrative and not in a limiting sense except as necessitated by the prior art.

What I claim and desire to secure by Letters Patent:

1. In the art of purifying water, that step which consists in the use of barium silicate to remove the hardness from the water.

2. The method of purifying water which consists in heating water, and adding barium silicate, to the heated water for removing the hardness therefrom.

3. The method of purifying water consisting in adding barium silicate to water containing a soluble carbonate.

4. The method of purifying water consisting in adding barium silicate to water containing magnesium carbonate.

In testimony that I claim the foregoing as my invention, I have signed my name hereunder.

ARTHUR LAW GRANT.